US006375730B1

(12) United States Patent
Liu et al.

(10) Patent No.: US 6,375,730 B1
(45) Date of Patent: *Apr. 23, 2002

(54) NON-OZONE DEPLETING CO-SOLVENT COMPOSITIONS

(75) Inventors: Ju-Chao Liu, deceased, late of West Hartford, by Tehyi Liu legal representative; Edward Fisher, Rocky Hill, both of CT (US)

(73) Assignee: Loctite Corporation, Hartford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/210,216

(22) Filed: Dec. 11, 1998

Related U.S. Application Data

(63) Continuation of application No. 08/691,597, filed on Aug. 2, 1996, now abandoned.

(51) Int. Cl.$^7$ .................................................. C09D 5/00
(52) U.S. Cl. ............................ 106/287.28; 106/287.1; 106/287.2; 106/285; 106/287.3; 106/287.11; 106/287.23; 106/287.25; 106/287.26; 106/287.27; 106/287.32
(58) Field of Search ................. 106/287.27, 287.26, 106/287.28, 287.2, 287.3, 287.32, 287.1, 287.11, 285, 287.25, 287.23

(56) References Cited

U.S. PATENT DOCUMENTS

| 3,260,637 | A | | 7/1966 | von Bramer |
| 3,671,493 | A | * | 6/1972 | Lomonaco et al. ........... 528/70 |
| 4,869,772 | A | | 9/1989 | McDonnell et al. |
| 4,942,267 | A | | 7/1990 | Roark et al. |
| 5,066,743 | A | | 11/1991 | Okamoto et al. |
| 5,079,098 | A | | 1/1992 | Liu |
| 5,098,593 | A | | 3/1992 | Rowe |
| 5,104,477 | A | | 4/1992 | Williams et al. |
| 5,171,902 | A | | 12/1992 | Krespan et al. |
| 5,240,641 | A | | 8/1993 | Rowe |
| 5,242,502 | A | | 9/1993 | Rowe |
| 5,244,507 | A | | 9/1993 | Rowe |
| 5,270,193 | A | * | 12/1993 | Eveleigh ...................... 435/181 |
| 5,314,562 | A | | 5/1994 | McDonnell et al. |
| 5,610,128 | A | * | 3/1997 | Zyhowski et al. .......... 510/288 |
| 5,643,525 | A | * | 7/1997 | McGinty et al. ............ 264/469 |
| 5,749,956 | A | * | 5/1998 | Fisher et al. ........... 106/287.28 |
| 5,811,473 | A | * | 9/1998 | Ramos et al. ............... 523/176 |
| 6,020,299 | A | * | 2/2000 | Chen et al. ................. 510/412 |

OTHER PUBLICATIONS

National Electronic Packaging and Production Conference; West 94; Anaheim, California Proceedings; "Performance Fluids for Cirtical Cleaning and Drying Applications", Grenfell, M.W.; Klink, F.W. and Owens, J.G.; 1994.

"Oxsol® Solvents"; Occidental Chemical Corporation; Aug. 1992.

* cited by examiner

Primary Examiner—Judy M. Reddick
(74) Attorney, Agent, or Firm—Hoffmann & Baron, LLP

(57) ABSTRACT

A non-ozone depleting, non-flammable co-solvent composition useful as a carrier for actives such as accelerators, catalysts, initiators, activators and other primer materials for use as adhesive promoter compositions in combination with adhesive compositions. The co-solvent compositions include an azeotropic, non-flammable solution of a fluorinated compound and a substituted benzene compound.

13 Claims, No Drawings

NON-OZONE DEPLETING CO-SOLVENT COMPOSITIONS

This application is a continuation of U.S. application Ser. No. 08/691,597 filed Aug. 2, 1996 now abandoned.

FIELD OF THE INVENTION

This invention relates to a non-ozone depleting, non-flammable co-solvent composition useful as a carrier for actives such as accelerators, activators, catalysts or other primer materials for use in combination with adhesive compositions. More particularly, the present invention relates to a co-solvent composition comprising a solution of a fluorinated compound and a substituted benzene compound.

BACKGROUND OF THE INVENTION

Chlorinated hydrocarbons such as 1,1,1-trichloroethane, other chlorinated solvents and chlorfluoro hydrocarbons (CFC's), such as $C_2F_3Cl_3$, also known commercially under the trademark FREON®, have been used for many years as solvents in numerous applications. These materials have shown to be very useful in the preparation of and as carriers for primer, activator, catalyst and accelerator compositions used in the adhesive field. These accelerators compositions often contain compounds, such as amine-bearing compounds, which require a solvent carrier for proper transport to and penetration of the substrate surface. Additionally, solvents are used to dilute the pure active compound to a useful concentration, usually on the order of about 0.01 to about 2% by weight.

In recent years, the use of chlorinated hydrocarbons, other chlorinated solvents and CFC's has been substantially lessened due to their deleterious effect on the environment. Regulations have been promulgated not only in the United States but in countries throughout the world to accelerate the phase-out of environmentally destructive solvents, and in particular those which are believed to be ozone-depleting substances. In addition to laws designed to prevent the use of these substances, product labeling requirements have also been promulgated to insure notice is given as to those compounds used as alternatives. Finding acceptable alternatives, however, has been an extremely difficult task. For example, in applications such as adhesive accelerator compositions, the solvent must possess high chemical stability, non-flammability, low toxicity, and have a low volatile organic solvent (VOC) content, yet be sufficiently volatile to readily evaporate once applied, depositing the active ingredient, e.g. an amine accelerator, on a substrate. In addition to these requirements, consideration must be given to cost factors which are important for commercial feasibility.

Attempts to find good solvent systems which balance non-ozone depleting and non-flammable characteristics with sufficient volatility to be useful in adhesive applications, have not been entirely successful. Although many materials possess the ability to act as volatile solvents, most have been too flammable or toxic to serve as suitable replacements for conventional ozone-depleting compounds, i.e. chlorinated hydrocarbons or CFC's. For example, materials such as heptane, acetone, methylethyl ketone, isopropanol, and methanol are excellent solvent systems, with good volatility, i.e. low flash point temperatures and high vapor pressures, but are extremely flammable. Other substances such as isoparaffins, and propylene glycol ether are less flammable, but do not exhibit adequate solvent performance properties for use in primer or accelerator compositions for adhesive systems.

One particular class of non-ozone depleting substances, which have been used in non-aqueous cleaning applications, are perfluorocarbons (PFC's). These materials are essentially non-toxic, non-flammable and thermally and hydrolitically stable alternatives to CFC's. In fact, the U.S. Environmental Protection Agency (EPA) has exempted PFC's from their VOC list, which indicates that they are non-ozone depleting and essentially non-reactive and non-polluting in the vapor phase. PFC's do, however, have the drawback of having low solvency for polar materials and most hydrocarbons. Thus, perfluorocarbons would not in themselves be expected to be useful as carriers for materials which require a solvent carrier, such as adhesion promoter compositions.

It is apparent, therefore, that a need exists for a solvent system which can carry actives, such as accelerator, activator, initiator, catalyst or primer compounds for adhesives, and which possess the following characteristics: non-ozone depleting, non-flammable, little or no VOC yet sufficient volatility for use as a carrier for active ingredients, low in toxicity and affordable in cost. The present invention is directed to overcoming the solvency deficiencies of perfluorocarbons, as well as addressing the aforementioned requirements for a useful alternative to CFC's.

SUMMARY OF THE INVENTION

The present invention is directed to non-ozone depleting and non-flammable solvent composition which include a solution of a fluorinated first component selected from the group consisting of perfluorocarbons, dihydropolyfluoroalkanes having from 5 to 7 carbons and mixtures thereof; and a substituted benzene second component selected from the group consisting of parachlorobenzotrifluoride, monochlorotoluene, 3,4-dichlorobenzo-trifluoride, perchloroethylene, alpha, alpha, alpha-trifluorotoluene and mixtures thereof.

It has been discovered that the aforementioned fluorinated first component when combined with the substituted benzene second component results in a co-solvent composition which has the above-desired characteristics necessary to serve as replacements for CFC's in adhesive promoter compositions. For purposes of the present invention, the term "promoter" will be used to include accelerator, activator, initiator, catalyst or adhesion enhancing compounds, as well as other compounds used for initiating, accelerating or otherwise enhancing the polymerization of adhesive compositions.

Examples of materials useful with the co-solvent composition are active materials including tridodecylamine, 1,8-diazobicycloundecene, trihexadecylamine, hexamethyldisilazane, N-tert-butyl-2-benzothiazidesulfenamide, amine/BF3 complexes, dimethylparatoluene, N,N-diethyle-p-toluidene, triethylamine, tributylamine, aniline, benzylamine, triethylenetetramine, hydroxyethyldimethylamine, methylene-bis-4,4'-(N,N-dimethyl-o-toluidine) and combinations thereof.

The inventive co-solvent compositions are non-ozone depleting, non-flammable solvent systems which serve as excellent carriers for the aforementioned promoter components. Thus, for example, an amine accelerator for cyanoacrylate adhesives, may be added to the co-solvent composition to form an accelerator composition. Other promoter compositions for various adhesive systems, such as anaerobic adhesives, olefinic adhesives, epoxy adhesives, and acrylic adhesives, among others, may be formed from the present co-solvent compositions. Such promoter compositions are formed by adding the promoter component to the co-solvent composition in an appropriate amount such that when applied to a substrate surface, sufficient promoter component will be deposited to serve its intended function. The co-solvent compositions of the present invention are azeotropic which correlates with their non-flammable volatility.

The respective amounts of the two co-solvent materials may vary and is only limited by respective amounts which will no longer effectively dissolve actives. In general, the co-solvent compositions include the fluorinated first component to be present in amounts of about 60% to about 93% by weight, preferably about 70% to 80% of the composition, and most preferably about 75% to about 78%. The substituted benzene second component may be present in amounts of about 7% to about 40% by weight, and preferably about 10% to about 25% and most preferably, about 15% to about 20% of the co-solvent composition.

These co-solvent solutions can be used as carriers or hosts for a variety of active ingredients and guest materials which are dispersible or dissolvable therein. In preferred applications, the active material is an accelerator compound, such as an amine-containing compound, useful for accelerating the cure speed of adhesive compositions, and in particular, cyanoacrylate adhesives. In addition to such an accelerator compound, other materials can be incorporated into the co-solvent solution such as adhesion promoters, stabilizers, viscosity modifiers, odor masking agents, coloring agents, plasticizers and the like, and mixtures of these materials.

In a further aspect, the present invention includes a method of preparing an adhesive promoter composition, which includes the steps of forming a co-solvent composition of fluorinated first component and a substituted benzene second component, both as defined herein and which is liquid at room temperature and adding to said co-solvent composition a material which promotes the cure and/or enhances the adhesion of an adhesive.

The present invention further provides a method of bonding a non-polar substrate to another substrate, which may be polar or non-polar, which method comprises treating the non-polar substrate with an adhesive promoter composition which includes a co-solvent composition comprising the aforementioned fluorinated first component, the aforementioned substituted benzene second component and an adhesive promoter component.

DETAILED DESCRIPTION AND PREFERRED EMBODIMENTS

The non-ozone depleting and non-flammable co-solvent compositions of the present invention include a solution of a fluorinated first component selected from the group consisting of perfluorocarbons, dihydropolyfluoroalkanes having from 5 to 7 carbons, trihydropolyfluoroalkanes having from 5 to 7 carbons and mixtures thereof; and a substituted benzene second component selected from the group consisting of parachlorobenzotrifluoride, monochlorotoluene, 3,4-dichlorobenzo-trifluoride, perchloroethylene, alpha, alpha, alpha-trifluorotoluene and mixtures thereof.

In a typical perfluorocarbon compound, fluorine atoms replace all of the carbon-bound hydrogen atoms on the hydrocarbon parent molecule. The strength of the carbon-fluorine bond allows for a high degree of thermal and chemical stability, resulting in low toxicity and low solvency for polar molecules and most hydrocarbons. For a discussion of these properties, see Grenfell, et al., "Performance Fluids For Critical Cleaning and Drying Applications", presented at the National Electronic Packaging and Production Conference. Thus, while their poor solvency for polar molecules and hydrocarbons makes them good choices for use on plastics, they have not been useful as solvents for adhesive promoter compounds. In fact, due to their inertness, few compounds have been known to dissolve in them. However, it has been discovered that the addition of the substituted benzene compounds disclosed herein to the perfluorocarbon greatly improves perfluorocarbon solubility, and results in a newly formed co-solvent composition. This composition can then be used as a carrier for a variety of active ingredients or guest materials. As previously mentioned, perfluorinated compounds have been found to be useful as cleaning fluids for fluorinated greases. Grenfell, et al. attributes this usefulness to the increase in perfluorocarbon solvency capability when azeotropic combinations are formed with specific hydrocarbons. For example, Grenfell, et al. discloses azeotropic mixtures of perfluoro-N-ethyl morpholine (90%) and 2,2,4 trimethylpentane (10%); and azeotropic mixtures of $C_6F_{14}$ (90%) and t-amylmethyether. These mixtures were found to have improved solvency and subsequently improved cleaning ability. These hydrocarbons, however, would not be useful in the present invention due to their flammability and incompatibility with various substrates In addition to the perfluorocarbons, certain dihydro- and trihydropolyfluoroalkanes have also been found to be useful. These compounds have from 5 to 7 carbons and their preparation is described in U.S. Pat. No. 5,171,902. Examples of these compounds include $CF_3CHFCHFCF_2CF_3$, $CF_3CH_2CHFCF_2CF_3$, $CF_3CHFCH_2CF_2CF_3$, $CF_3CHFCHFCF_2CF_2CF_3$, $CF_3CH_2CHFCF_2CF_2CF_3$, $CF_3CHFCH_2CF_2CF_2CF_3$, $CF_3CF_2CH_2$, $CHFCF_2CF_3$, $CF_3CF_2CHFCHFCF_2CF_3$, $CF_3CHFCHFCF_2CF_2CF_2CF_3$, $CF_3CHFCH_2CF_2CF_2CF_2CF_3$, $CF_3CH_2CHFCF_2CF_2CF_2CF_3$, $CF_3CF_2CHFCH_2CF_2CF_2CF_3$, and $CF_3CF_2CH_2CHFCF_2CF_2CF_3$. The preferred compound is 2,3-dihydrodecafluoropentane.

It has been surprisingly discovered that the above-mentioned fluorinated first components can be combined with the aforementioned substituted benzene second component to form azeotropic solutions which are useful as co-solvent carrier compositions for adhesive promoter components. These combinations due to their azeotropic characteristics, have substantially identical vapor and liquid state makeup at their boiling points, thereby acting as a simple substance. The formation of an azeotrope is important to the low flash-point and non-flammability properties necessary for commercial acceptability. For purposes of the present invention the term "non-flammable" will mean a flash-point of greater than about 200° F. (94° C.), whereby heating is required for the material to catch fire; and the term "flammable" will mean the material is ignitable with a spark rather than by heating, and having a flash point of less than about 100° F. (38° C.). Those compounds which have a flashpoint between 140–200° F. are classified as combustible. These definitions are believed to be in accordance with those set by the U.S. Department of Transportation (DOT).

As previously mentioned, the components of the present invention are non-flammable and non-combustible within the definition given above. This is in contrast to other materials, such as isoparaffins or propylene glycol ether, which have been proposed as CFC replacements. These conventional solvent materials, while possessing good solvency and volatility properties, are combustible at temperatures below about 200° F. (94° C.). Other materials which exhibit excellent solvency properties, such as heptane, acetone, methylethyl ketone, methanol, propanol and the like, are highly flammable, requiring only a spark for ignition.

Thus, the present invention balances the properties of good solvency, non-flammability and non-combustibility, without being ozone-depleting. The co-solvent compositions of the present invention can serve as carriers for a variety of materials. Additionally, the present compositions are sufficiently volatile to serve as excellent carriers or solvents for adhesive promoter compositions, and in particular, amine-containing accelerator compositions. This is due to their ability to dissolve basic compounds such as amines and the like, deposit them onto a substrate surface, and quickly evaporate or flash-off, leaving behind the promoter compounds for reaction with a subsequently applied adhesive composition. The azeotropic vapor composition is non-flammable, non-combustible, non-ozone depleting, and non-toxic.

The particular promoter component used will depend for the most part on the adhesive composition to be employed as well as the type of substrate to be bonded. For example, cyanoacrylates, anaerobics, acrylics, epoxies and olefins each have classes of compounds which activate, accelerate or otherwise promote their cure and/or enhance adhesion.

The co-solvent compositions of the present invention have been found to be particularly useful with accelerator compounds for cyanoacrylate adhesive compositions. Cyanoacrylate adhesives are rapid setting materials which have excellent utility in bonding a variety of materials. The polymerization of cyanoacrylate adhesives is catalyzed using basic, i.e., anionic compounds, such as hydroxyl- or amine-containing compounds. In the present invention, the adhesive promoter may be selected from a wide variety of compounds capable of catalyzing or initiating the polymerization or enhancing the affinity for a substrate process. For example, among those compounds to be included are:

a) organic or inorganic substituted and unsubstituted amines such as primary, secondary and tertiary amines and their salts;

b) N-substituted alkanoamines;

c) acylated N-substituted alkanoamines;

d) polyamines, such as diamines;

e) heterocyclic amines such as the diazabicyclo or triazabicyclo compounds disclosed in U.S. Pat. No. 4,869, 772.

(f) tertiary ammonium carboxylate compounds disclosed in U.S. Pat. No. 5,066,743 and having the formula:

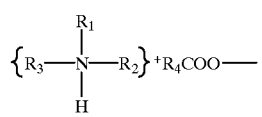

wherein $R_1$, $R_2$, $R_3$ and $R_4$ may each vary independently of each other and may be selected from the group consisting of alkyl, alkenyl, alkynyl, alkylaryl and arylalkyl, and preferably wherein at least one of $R_1$, $R_2$ and $R_3$ is a long chain alkyl moiety having 6–20 carbon atoms and $R_4$ is selected from the group consisting of alkyl and alkenyl;

g) phosphazene compounds including ring or chain polymers containing alternating phosphorus and nitrogen atoms, such as disclosed in U.S. Pat. No. 4,496,686;

h) ethylenediamine compounds such as those disclosed in U.S. Pat. No. 5,314,562 and having the formula:

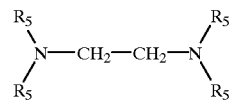

wherein each $R_5$, which may be the same or different, represents hydrogen, an alkyl, alkenyl or alkoxy group having 1 to 8 carbon atoms, an aryl group having 6 to 8 carbon atoms, a nitrogen-, silicon- or silicon-substituted group having 1 to 8 carbon atoms or a heterocyclic group having up to 8 carbon atoms which may be unsubstituted or substituted with hydroxy, ether oxygen or sulphur.

i) quaternary ammonium compounds useful as primers for improving the adhesion, as disclosed in U.S. Pat. No. 5,079,098, having the formula:

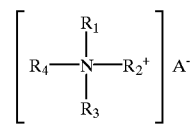

wherein $R_1$, $R_2$, $R_3$ and $R_4$ may each vary independently of the others and are selected from the group consisting of alkyl, hydroxyalkyl, aryl, alkaryl, aralkyl and alkenyl, optionally substituted with heteroatoms; and A– is an anion whose $pK_a$ value in deprotonation equilibrium reaction is greater than about 0.

The above-mentioned U.S. Pat. Nos. 4,869,772, 5,066, 743, 5,079,098, 4,496,686 and 5,314,562 are herein incorporated by reference.

Other useful amines include those disclosed in U.S. Pat. No. 3,260,637, used as accelerators for cyanoacrylates.

$BF_3$/amine salts have also been found to be useful as adhesive promoter compounds. These $BF_3$/amine complexes may be formed prior to adding to the adhesive primer composition, or formed in situ in the adhesive primer composition. In the latter case, $BF_3$ in etherate or acetic acid medium, is reacted with an amine.

Tertiary amine/$BF_3$ salts are preferred. The addition of specific ratios of amine to $BF_3$, e.g., 5:1, allows for control over fixture time and can prevent or minimize blooming. Blooming is a cosmetic nuisance which results when adhesive vapor vaporizes and polymerizes on the edge of the bondline. The $BF_3$/amine salt may be employed in effective promotor amounts and when used as a promotor for cyanoacrylate adhesives are effective in amounts of about 0.01 to about 4.0% by weight.

Among the preferred class of amines are those selected from the group consisting of tridodecylamine (TDDA), 1,8-diazobicycloundecene (DBU), trihexadecylamine, hexamethyldisilazane, tertiary amine/$BF_3$ complexes and mixtures thereof. The compounds have been found to be particularly useful in the present invention to form an activator composition for cyanoacrylate adhesive compositions, and the like.

The co-solvent compositions of the present invention can be used with a variety of adhesive systems and are compatible with metallic and non-metallic surfaces. Adhesive promoter systems formed from the co-solvent compositions can be used on numerous types of bonding surfaces, such as steel, plastic, glass and wood. The co-solvent carrier compositions of the present invention provide a more environmentally friendly alternative to conventional solvents and, due to their inertness are compatible with, i.e. do not attack, most engineering plastics. In addition to being non-ozone depleting and non-flammable, the co-solvent carrier compositions of the present invention are low in toxicity, fast drying, i.e. quick evaporating, and can be commercially produced in a cost effective manner.

As previously mentioned, the present co-solvent compositions are formed by co-dissolving at least one halogenated and preferably fluorinated first component, such as a perfluorocarbon selected from the group consisting of perfluoromethylmorpholine, perfluoroalkanes having from 5 to 8 carbon atoms, dihydro- or trihydropolyfluoroalkanes having from 5 to 7 carbons, with an aliphatic hydrocarbon second component.

In one preferred embodiment of the invention, the co-solvent composition includes a combination of: I) a fluorinated compound having the empirical formula $C_5F_{11}NO$, or $C_5H_2F_{10}$ and ii) parachlorobenzotrifluoride. The fluorinated compound may be present in amounts of about 60 to about 93% by weight, preferably about 70 to about 80% and most preferably, about 75 to about 78% by weight. In general, the parachlorobenzotrifluoride may be present in amounts of about 7.0 to about 40% by weight, preferably about 10 to about 25% by weight, and most preferably about 15 to about 20% by weight. In general, the co-solvent composition is prepared by co-dissolving, for example, about 7.0 to about 40% by weight of the substituted benzene second component, i.e., parachlorobenzotrifluoride or 3,4-dichlorobenzotrifluoride and the like in the fluorinated first component.

Another embodiment of the invention discloses a non-ozone depleting, non-flammable delivery system wherein the co-solvent serves as a carrier for actives or guest materials which are dispersible or dissolvable therein to form a homogeneous mixture or solution. In preferred applications, the guest material is an amine-containing compound, useful for accelerating the cure speed for adhesive compositions.

Other conventional additives useful in adhesive promoter compositions may be incorporated into the co-solvent compositions. These include, without limitation, stabilizers, viscosity modifiers, odor masking agents, coloring agents, plasticizers, and mixtures thereof.

The co-solvent compositions of the present invention may be formed into adhesive promoter compositions by the addition of an adhesive promoter component. In such a case, the adhesive promoter composition would include the co-solvent composition, and an active such as an adhesive promoter component. The present invention, when combined with an adhesive promoter component and employed as an adhesive promoter composition is intended to be applied to the surface of a metallic or non-metallic surface to be bonded, followed by application of the adhesive thereover, and finally, pressing together of the surfaces. These compositions are generally termed primer compositions. Such compositions are most effective when the surface free-energy of the solvent is close to that of the substrate surface to be adhesively bonded.

The concentration of the promoter component in a particular adhesive promoter composition may be determined by the type of adhesive, particular substrate surface, the promoter selected and the desired function or result. Generally, the promoter component is present in the adhesive promoter composition in amounts which are effective to produce the required cure speed and tensile strength. For example, amounts of from about 0.01% to about 10% by weight of the adhesive promoter composition are useful, with preferred amounts being about 0.01 to about 2%, and most preferably, about 0.25 to about 0.60% by weight. It is preferred to apply the adhesive promoter composition at the lowest effective concentration to decrease cost and increase ease of application, as well as allow the accelerator to be close to the thickness of a monomolecular layer. Typically, one application of the adhesive promoter on one side of the substrate is sufficient, although in certain instances it may be advantageous to coat both substrates. Multiple coatings may be applied where larger bond gaps and thicker adhesive layers are used.

The adhesive promoter composition comprising the co-solvent composition and the promoter component may be applied to the substrate surface to be bonded with the cyanoacrylate, or other adhesive, in any manner that is satisfactory to effect the desired result, e.g., to initiate or accelerate cure or enhance substrate adhesion. For example, spraying, dipping, brushing, swabbing, wiping, roller coating, etc. of the adhesion promoter composition onto one or more of the substrate surfaces prior to application of the adhesive, is preferred.

The thickness of the adhesive promoter composition and adhesive layer may vary widely, depending on the character and composition of the substrate surfaces, the particular adhesive and accelerator to be employed, as well as the end use of the final bonded assembly. With any given set of parameters, acceptable and optimum thicknesses may be determined by tensile shear strength values for particular samples at various primer and adhesive layer thicknesses. The adhesive layer of about "0" to about 5 mils and as great as about 10 mils have been found to be generally satisfactory for many substrates.

The co-solvent compositions of the present invention can be safely applied to a large variety of polymeric substrates, including thermosets and thermoplastics. Examples of thermoplastic materials include, without limitation, polycarbonate (PC), polyphenylene ether alloy, polyphenylene sulfide, polyphenylene oxide, nylon, melamine, polyacetal, polycarbonate, polyesters such as polybutyleneterephthalate (PBT) and polyethyleneterephthalate (PET), acrylic, acrylonitrile butadiene styrene (ABS), cellulose acetate, ethylene vinyl acetate (EVA), ionomer, polyaryl ether, and polyolefins such as polyethlene, polypropylene, polybutylene and polyallomer, polymethylpentane, polystyrene, polysulfone, polyvinyl chloride (PVC), styrene acrylonitrile (SAN), and styrene butadiene; thermosets such as epoxides and phenolics, among others, are also useful. Polytetrafluoroethylene (PTFE) has also been successfully bonded to using co-solvent compositions of the present invention. Composites, such as epoxy glass substrates, may also be used in conjunction with the inventive adhesion promoter and co-solvent compositions.

Other substrates, such as wood, metal, rubber, leather, cloth, paper or ceramics, are of course contemplated, since the co-solvent compositions of the present invention may be customized for a particular application by incorporation of the desired accelerator component.

As previously mentioned, the co-solvent compositions of the present invention are especially useful as carriers for cyanoacrylate adhesive promoter compositions, particularly for enhanced adhesion. Suitable cyanoacrylate adhesives are represented by the general formula:

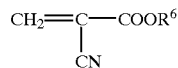

wherein $R^6$ is alkyl, alkenyl, cycloalkyl, aryl, alkoxalkyl, aralkyl, haloalkyl or other suitable group. The lower alkyl alpha-cyanoacrylates are preferred. In particular, these include methyl, ethyl, n-propyl, n-butyl, isobutyl, isopropyl, allyl, cyclohexyl, methoxyethyl, methoxypropyl, cyclohexyl, n-pentyl, allyl, and ethoxyethyl cyanoacrylates.

If a structural or engineering adhesive is to be employed, such as an anaerobic, the co-solvent composition can contain an anaerobic accelerating component which interacts with an initiator present in the adhesive composition to speed the cure. Tertiary alkyl amines, rhodamine and organic hydrazides, alkoxy amines, as well as ferrocene compounds are conventionally used as anaerobic accelerators.

Acrylic adhesives are typically two part systems; the first part containing the monomer and initiator component; and the second part containing the accelerator or curative component, which in the context of the present invention would be carried in the co-solvent composition. Other two part systems, such as epoxy systems, may also employ the co-solvent compositions of the present invention for carrying the curing agent, e.g. amines, anhydrides and the like.

The features and advantages of the present invention will be more clearly understood by reference to the following examples, which are illustrative of certain preferred embodiments but are not to be construed as limiting the scope of invention.

Unless otherwise stated, the examples of the present invention used are commercially available alpha-cyanoacrylate adhesive, Loctite® Adhesive 414 to bond the test specimens.

EXAMPLE 1

The following co-solvent compositions of the present invention are prepared by co-dissolving the perfluorocarbon with a substituted benzene compound using simple mixing procedures at room temperature.

| | Co-Solvent Compositions % weight | | |
|---|---|---|---|
| | A | B | C |
| Perfluorocarbon | | | |
| $C_5F_{11}NO$ | 64 | 80 | 90 |
| Substituted Benzene | | | |
| Parachlorobenzotrifluoride | 36 | 20 | 10 |

The co-solvent compositions were determined to be non-flammable and azeotropic.

EXAMPLE 2

The following inventive co-solvent compositions are prepared by co-dissolving a dihydropolyfluoroalkane with a substituted benzene compound using simple mixing procedures at room temperature.

| | Co-Solvent Compositions % weight | |
|---|---|---|
| | A | B |
| 2,3-dihydrodecafluoropentane | 73 | 80 |
| parachlorobenzotrifluoride | 27 | 20 |

EXAMPLE 3

An adhesive primer composition was prepared in accordance with the present invention:

| | % weight |
|---|---|
| Co-Solvents | |
| $C_5F_{11}NO$ | 88 |
| Parachlorobenzotrifluoride | 7.5 |
| Active | |
| 1,8-diazobicyclo-undecene (DBU) | 0.1 |
| Adhesion Promoter | |
| $C_{7-8}$ isoparaffin | 4.4 |

The formulation was non-flammable, i.e. exhibited no flashpoint at 200° F. The active readily dissolved in the co-solvent composition. The addition of the adhesion promotor was optional.

Block tensile shear tests on polypropylene, in accordance with ASTM D-4501, resulted in an average bond strength of 2755 psi. The adhesive used was an alpha-cyanoacrylate adhesive marketed commercially as LOCTITE® Adhesive 414. The blocks were coated with the above primer composition, followed by application of the adhesive and joining of the blocks. Cure proceeded at room temperature for 24 hours prior to testing.

EXAMPLE 4

An adhesive primer composition was prepared in accordance with the present invention:

| | % weight |
|---|---|
| Co-Solvents | |
| $C_5F_{11}NO$ | 91.9 |
| Parachlorobenzotrifluoride | 8.0 |
| Active | |
| 1,8-diazobicyclo-undecene (DBU) | 0.1 |

Block tensile shear tests on polypropylene, in accordance with ASTM D-4501, resulted in an average bond strength of 828 psi. The adhesive and cure time was the same as Example 3.

EXAMPLE 5

An adhesion primer composition was prepared in accordance with the present invention:

| | % weight |
|---|---|
| Co-Solvents | |
| $C_5F_{11}NO$ | 69.8 |
| Parachlorobenzotrifluoride | 30.0 |
| Active | |
| Tridodecylamine (TDDA) | 0.2 |

The adhesive was tested for on-part life on polypropylene. On-part life is the optimal amount of time the active ingredient remains effective on the surface of the substrate once the co-solvent carrier has evaporated, prior to application of the adhesive.

| ON-PART TIME | AVERAGE PSI* |
|---|---|
| 1 hr | 2658 |
| 2 hr | 2338 |
| 4 hr | 2402 |

Block shear tensile tests were also run on the following polyolefin substrates which were adhesively joined without on-part time delay.

| | Average PSI |
|---|---|
| Polypropylene | 2,749 |
| High density polyethylene | 2,651 |
| Low density polyethylene | 1,105 |

EXAMPLE 6

An adhesive primer composition was prepared in accordance with the present invention:

| | % weight |
|---|---|
| Co-Solvents | |
| $C_5F_{11}NO$ | 88.0 |
| Parachlorobenzotrifluoride | 8.0 |
| Active | |
| 1,8-diazobicyclorindecene (DBU) | 0.1 |
| Adhesion Promoter | |
| $C_{8-9}$ isoparaffin | 3.9 |

The composition was used to prime polypropylene blocks and block tensile shear tests were run in accordance with ASTM D-4501. The adhesive and cure time was the same as in Example 3. The average tensile bond strength was found to be 2,450 psi. The composition was azeotropic and non-flammable.

EXAMPLE 7

The following primer composition of the present invention was prepared.

| | % weight |
|---|---|
| Co-Solvents | |
| Parachlorobenzotrifluoride | 20.0 |
| 2,3-dihydrodecafluoropentane | 77.8 |
| Active | |
| TDDA | 0.2 |
| Adhesion Promoter | |
| $C_{8-9}$ isoparaffin | 2.0 |

The following substrates were primed and assembled using alpha-cyanoacrylate. The test specimens were allowed to cure for 1 hour at room temperature and block shear tensile tests were conducted with the following results. The composition was azeotropic and non-flammable.

| Substrate | Average PSI |
|---|---|
| Polypropylene (PP) | 2,804 |
| High density polyethylene (LDPE) | 2,263 |
| Low density polyethylene (HDPE) | 1,160 |

On-part times were also investigated on polypropylene using the same testing procedures and materials as above, with the following results:

| On-Part Time | psi |
|---|---|
| 0.5 hr | 2,435 |
| 1.0 hr | 2,719 |
| 1.5 hrs | 2,593 |
| 2.0 hrs | 2,450 |

It is suggested that the primer exhibited excellent bond strength after on-part times of up to 2 hours.

EXAMPLE 8

The following azeotropic, non-flammable primer composition was prepared in accordance with the present invention:

| | % weight |
|---|---|
| Co-Solvents | |
| $C_5F_{11}NO$ | 75.2 |
| Parachlorobenzotrifluoride | 22.5 |
| Active | |
| DBU | 0.2 |
| TDDA | 0.1 |
| Adhesion Promoter | |
| $C_{8-9}$ isoparaffin | 2.0 |

The composition was applied to different polyolefin substrates, as well as to two different grades of a propylene/ ethylene-propylene-diene monomer copolymer blend (PP/EPDM). The respective substrates were joined using alpha-cyanoacrylate adhesive and allowed to cure for 1 hour at room temperature. The results are indicated below.

| Substrate Type | psi |
| --- | --- |
| PP | 3,428 |
| LDPE | 1,221 |
| HDPE | 2,646 |
| PP/EPDM (203-50 Shore D) | 1,587 |
| PP/EPDM (201-55 Shore A) | 156 |

In all cases, The tests resulted in substrate failure before failure of the adhesive bond. The results reported are an average of three test specimens.

On-part life for the above primer composition was also tested on polypropylene. The tests were run on block shears as described in the previous examples.

| On-Part Time | psi |
| --- | --- |
| 1 hr | 2,837 |
| 2 hrs | 2,424 |
| 3 hrs | 2,000 |
| 4 hrs | 2,879 |

As seen above, excellent bond strength is obtained even after on-part times of 4 hours.

EXAMPLE 9

The following azeotropic, non-flammable primer composition was prepared in accordance with the present invention.

| | % weight | |
| --- | --- | --- |
| | I | II |
| Co-Solvents | | |
| $C_5F_{11}NO$ | 82.5 | 61.9 |
| Parachlorobenzotrifluoride | 15 | 36 |
| Active | | |
| TDDA | 0.5 | 0.1 |
| Adhesion Promoter | | |
| $C_{7-8}$ isoparaffin | 2.0 | 2.0 |

The compositions were found to have flashpoints greater than 200° F.

Block tensile shears were prepared in accordance with ASTM D4501. The primer was applied to the substrates listed below, followed by application of the alpha-cyanoacrylate and joined of the test specimens. The specimens were allowed to cure at room temperature for 24 hours prior to testing, which was also conducted at room temperature.

| Substrate Type | Comp. I psi |
| --- | --- |
| PP | 3,214 |
| LDPE | 1,115 |
| HDPE | 2,335 |
| PP/EPDM (203-50 Shore D) | 570 |

The tensile shear results are averages of five test specimens for each substrate. With the exception of one test specimen for santoprene and one test specimen for HDPE, all other specimens resulted in substrate failure prior to adhesive failure.

EXAMPLE 10

The following azeotropic, non-flammable primer composition was prepared in accordance with the present invention.

| | % weight |
| --- | --- |
| Co-Solvents | |
| $C_5F_{11}NO$ | 81.3 |
| Parachlorobenzotrifluoride | 16.5 |
| Active | |
| TDDA | 0.2 |
| Adhesion Promoter | |
| $C_{7-8}$ isoparaffin | 2.0 |

The composition was found to have a flashpoint of greater than 230° F., and an evaporation time on polypropylene blocks of about 35–50 seconds.

Block tensile shear polypropylene specimens were prepared and tested as in Example 9. The results are given below.

| On-Part Life | psi |
| --- | --- |
| 0 | 2,728 |
| 1 hr | 2,666 |
| 2 hrs | 2,525 |
| 2.75 hrs | 2,671 |
| 5 hrs | 2,711 |
| 6 hrs | 2,499 |
| 7 hrs | 2,418 |
| 7.75 hrs | 1,873 |
| 16 hrs | 2,547 |
| 24 hrs | 3,037 |

Block tensile tests using the same curing and testing procedures were also run on LDPE and HDPE with the following results:

| Substrate Type | psi |
| --- | --- |
| HDPE | 1,956 |
| LDPE | 1,165 |

EXAMPLE 1

The following azeotropic, non-flammable primer composition was made in accordance with the present invention.

| | % weight |
|---|---|
| Co-Solvents | |
| $C_5F_{11}NO$ | 75.4 |
| Parachlorobenzotrifluoride | 22.5 |
| Active | |
| TDDA | 0.09 |
| DBU | 0.18 |
| Adhesion Promoter | |
| $C_{8-9}$ isoparaffin | 1.83 |

Polypropylene test specimens (1"×1"×0.25") were primed with the composition and assembled using alpha-cyanoacrylate. Fixture times were found to be 5 seconds or less. Drying time of the primer was 18 seconds on two of the specimens and 49 seconds on a third specimen.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A non-ozone depleting, non-flammable adhesive promoter composition comprising:
   (i) a co-solvent carrier solution comprising:
      (a) a fluorinated first component selected from the group consisting of perfluorocarbons, dihydropolyfluoroalkanes having 5 to 7 carbons, trihydropolyfluoroalkanes having 5 to 7 carbons and mixtures thereof, and
      (b) a substituted benzene second component selected from the group consisting of parachlorobenzotrifluoride, monochlorotoluene, 3,4-dichlorobenzotrifluoride, alpha, alpha, alpha-trifluorotoluene and mixtures thereof, and
   (ii) an adhesive promoter compound comprising an active material which is dispersible or dissolvable in said carrier solution, said active material being selected from the group consisting of: tridodecylamine, 1,8-diazobicycloundecene, trihexadecylamnine, hexanethyldisilazane N-tert-butyl-2-benzothiazidesulfenamide, an arine/$BF_3$ complexes, dimethylparatoluene, N,N-diethyl-p-toluidene, triethylamine, tributylamine, aniline, benzylamine, triethylenetetramine, hydroxyethyldimethylamine, methylene-bis-4,4'-(N,N-dimethyl-o-toluidine) and combinations thereof.

2. The carrier composition of claim 1 wherein the perfluorocarbon is selected from the group consisting of perfluoromethylmorpholine, perfluoroalkanes having from 5 to 8 carbon atoms and mixtures thereof.

3. The composition of claim 1 wherein the perfluorocarbon is present in amounts of about 60% to about 90% by weight of the total composition.

4. The composition of claim 1 wherein the perfluorocarbon is $C_5F_{11}NO$ and the second component is parachlorobenzotrifluoride.

5. The composition of claim 4 wherein the perfluorocarbon is present in amounts of from about 90% to about 60% by weight of the total composition and the parachlorobenzotrifluoride is present in amounts of about 10% to about 40% by weight of the total composition.

6. The composition of claim 1 wherein the substituted benzene compound is present in amounts of about 10% to about 40% by weight of the total composition.

7. The composition of claim 1 wherein the active material is present in an amount of from about 0.01% to about 10% by weight of the total composition.

8. The composition of claim 1 wherein there is additionally incorporated an additive selected from the group consisting of stabilizers, viscosity modifiers, odor masking agents, adhesion promoters, coloring agents, plasticizers and mixtures thereof.

9. The composition of claim 1 wherein said adhesive promoter composition can be used for bonding one or more substrate surfaces.

10. The composition of claim 9, wherein said substrate surfaces are selected from the group consisting of polymeric substrates, wood, metal, leather, cloth, paper, ceramics and composites.

11. The composition of claim 10, wherein said polymeric substrates are selected from the group consisting of thermosets and thermoplastics.

12. The composition of claim 11, wherein said thermoplastics are selected from the group consisting of polycarbonate, polyphenylene ether alloy, polyphenylene sulfide, polyphenylene oxide, nylon, melamine, polyacetal, polyesters, polybutyleneterephthalate, polyethyleneterephthalate, acrylic, poly(acrylonitrile-co-butadiene-co-styrene)(ABS), cellulose acetate, polyethylene vinyl acetate, ionomer, polaryl ether, polyolefins, polyethylene, polypropylene, polybutylene, polyallomer, polymethylpentane, polystyrene, polysulfone, polyvinyl chloride, poly(styrene-co-acrylonitrile)(SAN), and poly (styrene-co-butadiene).

13. The composition of claim 9, wherein the adhesive promoter composition is capable of being applied to said substrate surfaces in a manner selected from the group consisting of spraying, dipping, brushing, swabbing, wiping and roller coating.

* * * * *

UNITED STATES PATENT AND TRADEMARK OFFICE
CERTIFICATE OF CORRECTION

PATENT NO.   : 6,375,730 B1
DATED        : April 23, 2002
INVENTOR(S)  : Ju-Chao Liu et al.

It is certified that error appears in the above-identified patent and that said Letters Patent is hereby corrected as shown below:

<u>Title page,</u>
OTHER PUBLICATIONS, the printed patent incorrectly reads "...Cirtical..."; the patent should read -- Critical... --.

<u>Column 1,</u>
Line 18, the printed patent incorrectly reads "...chlorfluoro..."; the patent should read -- ... chlorofluoro... --
Line 24, change "accelerators" to -- accelerator --

<u>Column 7,</u>
Line 20, the printed patent incorrectly reads "...and ii)..."; the patent should read -- and II)... --.

<u>Column 15,</u>
Lines 44-45, change "hexanethyldisilazane" to -- hexamethyldisilazane --

Signed and Sealed this

Fifth Day of November, 2002

*Attest:*

JAMES E. ROGAN
*Director of the United States Patent and Trademark Office*

*Attesting Officer*